United States Patent Office 3,484,455
Patented Dec. 16, 1969

3,484,455
2-IMINO-1,3-DITHIETANES AND PROCESSES FOR THEIR PREPARATION
Roger Williams Addor, Pennington, N.J., assignor to American Cyanamid Company, Stamford, Conn., a corporation of Maine
Filed Apr. 21, 1967, Ser. No. 632,566
Int. Cl. C07d 69/00; A01n 9/12; A61k 27/00
U.S. Cl. 260—327                8 Claims

ABSTRACT OF THE DISCLOSURE

The present invention relates to novel 2-imino- or 2-substituted imino-1,3-dithietanes and the acid addition salts thereof, to processes for their manufacture, and the use of such compounds as highly effective, insecticides, fungicides and biocides. More particularly, it relates to novel 2-imino-1,3-dithietanes which may be represented by the structure:

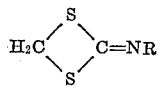

as well as the acid addition salts thereof, where R stands for hydrogen, (lower)alkyl, such as methyl, ethyl, propyl, butyl or pentyl, phenyl, halo-substituted phenyl, (lower alkyl)substituted phenyl, benzyl, halo-substituted benzyl, (lower)acyl, halo-substituted (lower)acyl, (lower alkyl)carbamoyl, halo-substituted (lower alkyl)carbamoyl, said halo being represented by fluoro, chloro, bromo or iodo, prepared by a plurality of novel procedures defined wtih particularity hereinbelow. Still more particularly, the invention is concerned with the utilization of the aforementioned 2-imino-1,3-dithietanes as highly effective insecticides, nematocides, fungicides or bactericides.

Exemplary compounds which fall within the purview of the invention are:

2-Imino-1,3-dithietane hydrochloride,
2-Ethylimino-1,3-dithietane hydrobromide,
2-Isopropylimino-1,3-dithietane,
2-Phenylimino-1,3-dithietane,
2-p-Propylphenylimino-1,3-dithietane,
2-Methylcarbamoylimino-1,3-dithietane,
2-Acetylminino-1,3-dithietane, and
2-Chloroacetylimino-1,3-dithietane.

In general, the compounds of the present invention may be conveniently synthesized by reacting a dithiocarbamate salt with a methylene halide or methylene sulfate in substantially equimolar quantities, preferably utilizing a molar excess of the latter reactant in the presence of a base, such as potassium hydroxide, sodium hydroxide or triethylamine, and an organic solvent, such as dimethylformamide, methanol or 1,2-dimethoxyethane, in accordance with the equations:

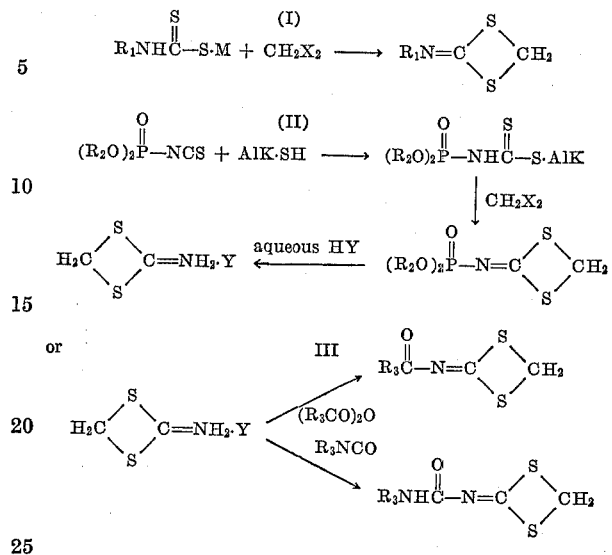

wherein $R_1$ represents (lower)alkyl, phenyl, halo-substituted phenyl, (lower alkyl)substituted phenyl, benzyl, (lower alkyl)substituted benzyl, halo-substituted benzyl; $R_2$ is (lower)alkyl; $R_3$ represents (lower)alkyl, halo-substituted (lower)alkyl, phenyl, halo-substituted phenyl or (lower alkyl)phenyl; M is ammonium, alkylammonium or alkali metal; X is halide, such as chloride, bromide or iodide; AlK is alkali metal, such as sodium, lithium or potassium; and Y is chloro, bromo, iodo or monohydrogen sulfate.

In the process illustrated by Reaction I above, exemplary dithiocarbamate salt reactants are: methylammonium methyldithiocarbamate, ethylammonium ethyldithiocarbamate, sodium i-propyldithiocarbamate, n-propylammonium n-propyldithiocarbamate, t-butylammonium t-butyldithiocarbamate; ammonium phenyldithiocarbamate; and benzylammonium benzyldithiocarbamate. With a methylene halide, such as methylene bromide, methylene chloride or methylene iodide, ring-closure of the ammonium alkyldithiocarbamate reactant occurs.

The dithietanes resulting from the process set forth in Reaction II above are readily prepared by reacting, for instance, substantially equimolar amounts of a phosphoryl isocyanate and an alkali metal hydrosulfide in the presence of a suitable solvent to obtain an alkali metal dithiocarbamate, and then reacting the latter with an equivalent of a methylene halide or methylene sulfate to obtain a 2-dialkoxyphosphinyl-1,3-dithietane. The latter is next reacted with concentrated mineral acid, such as hydrochloric acid. The corresponding acid addition salt of 2-imino-1,3-dithietane is obtained.

Advantageously, as illustrated in Reaction III above, the acid addition salts of 2-imino-1,3-dithietane as prepared by Reaction II above can be further reacted in the presence of a weak base, such as pyridine, triethylamine, sodium bicarbonate or sodium acetate with a variety of acylating or carbamylating agents. Exemplary agents are: acetic anhydride, chloroacetic anhydride, propionic anhydride, butyric anhydride, benzoic acid anhydride, methyl isocyanate, chloromethyl isocyanate, ethyl isocyanate, phenyl isocyanate, tolyl isocyanate or benzyl isocyanate.

The 2-imino-1,3-dithietane compounds of the present invention are highly effective as pesticides with a broad spectrum of activity against insects, nematodes and arachnids. Further, they are both effective systemically and on contact and can be applied to plant foliage, soil or water in either solid or liquid form as to protect the applied area from insect attack. Still further, they are highly useful in the control of undesirable plant growth, fungi and bacteria.

The quantity or amount of inert solid or liquid carrier with respect to the pesticidal compounds of the present invention as pesticides or herbicides is not critical. However, it has been found that up to about 10% by weight of the compound based on the weight of the inert carrier is generally sufficient to carry out the intent of the present invention. In most instances, it has been observed that from about 1% to about 10% of the active ingredient can be employed effectively and safely.

To facilitate a further understanding of the present invention, the following illustrative examples are presented. These are not to be taken as limitative of the invention. Unless otherwise stated, the parts are by weight and the analyses are in percent.

EXAMPLE 1

Preparation of 2-isopropylimino-1,3-dithietane

To 10.1 parts of triethylamine in 100 parts (by volume) of dimethylformamide are added 52 parts of methylene bromide in a suitable reaction vessel and then are added dropwise over 90 minutes 19.4 parts of isopropylammonium isopropyldithiocarbamate dissolved in 65 parts (by volume) of dimethylformamide. The reaction is maintained at 30° C.–33° C. and after an additional hour, the mixture is poured into 300 parts of ice-water and the resultant precipitated oil is partitioned into an ether/benzene medium. The organic layer is washed once with water and extracted with a total of 10 parts (by volume) of concentrated hydrochloric acid in 100 parts of water and twice again with water.

The aqueous acid extract is mixed with ether, ice-cooled, and 5.2 parts of sodium hydroxide in 50 parts of water are added. The water phase is separated, reextracted with ether and the combined ether extracts are water-washed, dried and concentrated by distilling-off ether. The residue is distilled under a reduced pressure of 2.5 mm. Hg and four colorless fractions, having a musty somewhat pyridine-like odor, are collected at 74° C.–77° C. The first three fractions amounting to 6.7 parts are 2-isopropylimino-1,3-dithietane of high purity having an index of refraction ($n_D^{25}$) equal to 1.5664.

Analysis.—Calcd. for $C_5H_9NS_2$—Calcd: C, 40.78; H, 6.16; N, 9.51; S, 43.55. Found: C, 41.03; H, 6.17; N, 9.60; S, 43.51.

The infrared spectrum shows a strong band at 1666 cm.$^{-1}$ assigned to the C=N function. The nuclear magnetic resonance spectrum shows a singlet at 6.12τ(—CH$_2$—2H)

a multiplet at 6.8τ

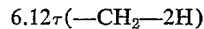

and a doublet at 8.88τ(—CH$_3$, 6H).

EXAMPLE 2

Substituting isopropylammonium isopropyldithiocarbamate by ammonium p-bromophenyldithiocarbamate, ammonium m-chlorophenyldithiocarbamate or ammonium phenyldithiocarbamate in Example 1 and following the procedure therein in every detail there are obtained in a good yield 2-p-bromophenylimino-1,3-dithietane, 2-m-chlorophenylimino-1,3-dithietane or 2-phenylimino-1,3-dithietane, respectively.

EXAMPLE 3

Preparation of 2-p-propylphenylimino-1,3-dithietane

The procedure of Example 1 is repeated in every detail except that triethylammonium p-propylphenyldithiocarbamate prepared by reacting an equimolar mixture of triethylamine and p-propyl aniline with one mole of carbon disulfide is substituted for the isopropylammonium isopropyldithiocarbamate reactant therein. There is then recovered 2-p-propylphenylimino-1,3-dithietane.

EXAMPLE 4

Preparation of 2-methylimino-1,3-dithietane

Replacing isopropylammonium isopropyldithiocarbamate with methylammonium methyldithiocarbamate in Example 1 above and repeating the procedure therein, 2-methylimino-1,3-dithietane is obtained as a colorless oil whose boiling point is 72° C.–73° C./3.5 mm. Hg. Its index of refraction ($n_D^{25}$) is 1.6212. In the infrared, the C=N absorption is at 1650 cm.$^{-1}$. The nuclear magnetic resonance spectrum shows singlets at 7.10τ and 6.20τ for the N—CH$_3$ and S—CH$_2$—S protons, respectively.

Analysis.—Calcd. for $C_3H_5NS_2$—Calcd: C, 30.22; H, 4.23; N, 11.75; S, 53.80; molec. wt. 119.2. Found. C, 30.16; H, 4.30; N, 11.70; S, 53.90; molec. wt. 121.

EXAMPLE 5

Preparation of 2-imino-1,3-dithietane hydrochloride

To 10.6 parts of 2-diethoxyphosphinylimino-1,3-dithietane stirred in a suitable round bottom flask are added 25 parts by volume of concentrated hydrochloric acid over a 15-minute period. After an additional 90 minutes, the mixture is ice-cooled and 75 parts (by volume) of acetone are added. The crystalline precipitate, collected on a glass filter and washed three times with acetone and once with ether, yields 4.68 parts of 2-imino-1,3-dithietane hydrochloride. The latter sample totally sublimed at 110°/0.2 mm. Hg; sublimed and unsublimed product has the same infrared spectra and behaved the same on melting.

Analysis.—Calcd. for $C_2H_4NS_2Cl$—Calcd: C, 16.96; H, 2.85; N, 9.89; S, 45.27; Cl, 25.03. Found: C, 16.72; H, 2.82; N, 9.92; S, 45.11; Cl, 25.14.

The infrared spectrum shows strong or medium strong bands at 1525, 1635, 1716 and 2855 (broad) cm.$^{-1}$ which must be associated with the

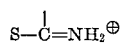

function. The nuclear magnetic resonance spectrum shows a singlet at 5.62τ (—S—CH$_2$—S).

In a melting point capillary, heating is carried out at a rate of 10 C./min. It is observed that discoloration begins at about 150° C., the solid is orange colored at 160° C. and melts at 166° C.–167° C. with decomposition.

The 2-diethoxyphosphinylimino-1,3-dithietane reactant employed in the example above is prepared as follows: To a mixture of 13 parts (by volume) of methylene bromide and 1.6 parts of sodium bicarbonate in 50 parts (by volume) of methanol are added rapidly portionwise 5.0 parts of potassium diethoxyphosphinyldithiocarbamate. After standing for about 20 hours, benzene is added to the resultant colorless mixture. Precipitated salts are next filtered off and the filtrate is concentrated in vacuo. The residue is again taken up in benzene/water. The mixture is filtered, and concentration of the filtrate affords 4.6 parts of slightly yellow oil. The oil, in benzene/ether, is washed three times with 1:1 water-saturated sodium chloride solution. The yield of recovered pale yellow oil amounts to 4.0 parts (89%).

EXAMPLE 6

Preparation of 2-acetylimino-1,3-dithietane

To an ice-cooled mixture of 2.0 parts of 2-imino-1,3-dithietane hydrochloride (as prepared in Example 5 above) and 20 parts (by volume) of acetic anhydride are added 4.0 parts of sodium acetate. After stirring for about 12 hours, the mixture is poured into ice and stirring is continued. When the ice has melted, the mixture is saturated with potassium bicarbonate added in small portions. Extraction of the mixture with benzene/ether yields 1.9 parts of a crystalline product, melting point 54.0 C.–55.6° C. After vacuum sublimation at 40° C.–42° C./0.2 mm. Hg., melting point 55.0° C.–55.8° C. is noted.

*Analysis.*—Calcd. for $C_4H_5NOS_2$.—Calcd: C, 32.63; H, 3.42; N, 9.52; S, 43.56. Found: C, 32.75; H, 3.34; N, 9.53; S, 43.77.

Substituting chloroacetic anhydride, dichloroacetyl chloride or bromoacetyl bromide for the acetic anhydride of Example 6 and repeating the procedure therein, the 2-chloroacetyl-, 2-dichloroacetyl, 2-trichloroacetyl, or the 2 - bromoacetylimino - 1,3 - dithietane derivatives, respectively, are obtained in good yield and purity.

EXAMPLE 7

Preparation of 2-benzoylimino-1,3-dithietane

The procedure of Example 6 is repeated in every detail except that benzoic acid anhydride is substituted for acetic anhydride. There is obtained in good yield 2-benzoylimino-1,3-dithietane.

EXAMPLE 8

Preparation of 2-methylcarbamoylimino-1,3-dithietane

To a stirred ice-cooled mixture of 2.0 parts of 2-imino-1,3-dithietane hydrochloride as prepared in Example 5 and 5.0 parts (by volume) of methyl isocyanate in 15 parts (by volume) of benzene are added 1.16 parts of sodium acetate in portions over ca. 30 minutes. After mixing overnight, resultant slurry is filtered and the solids are washed with benzene. The solids which contain much of the expected product are extracted by boiling with acetone several times. Crystalline solid amounting to 2.1 parts is rocevered by evaporation of the acetone and is combined with 0.2 part of the same material recovered from the benzene mixture after washing with water. Recrystallization from benzene affords 2.0 parts of small colorless needles in two crops having a melting point between 154.2° C. and 156.6° C. with decomposition.

*Analysis.*—Calcd. for $C_4H_6N_2OS_2$—Calcd: C, 29.61; H, 3.73; N, 17.27; S, 39.53. Found: C, 29.61; H, 3.70; N, 17.29; S, 39.42.

EXAMPLE 9

Preparation of 2-benzylimino-1,3-dithietane

The procedure of Example 1 above is repeated in every detail and wherein methylene bromide is added to a mixture of triethylamine and dimethylformamide. Benzylammonium benzyldithiocarbamate in dimethylformamide is then added slowly to the stirred mixture and stirring is continued for one hour. The resulting mixture is poured into ice water and the water separated from the residue. The residue is then treated with ether and benzene, washed with water, and extracted with concentrated hydrochloric acid in water. Ether is added to the aqueous acid extract, the mixture cooled, and sodium hydroxide added. The ether phase is separated from the water, concentrated under reduced pressure, and the resulting product recovered.

The benzylammonium benzyldithiocarbamate reactant is prepared in good yield from benzylamine and carbon disulfide.

The following examples illustrate the insecticidal, fungicidal and biocidal activity of representative compounds of the present invention.

EXAMPLE 10

The nematocidal activity of the compounds of the invention is demonstrated by the following tests wherein representative compounds are dissolved or suspended in one ml. of acetone and diluted with water to give 1000, 100, 100, 10 or 1 p.p.m. of test compound in the water. The solutions or suspensions are introduced in small vials and approximately one hundred vinegar eelworms (*Turbitrix aceti*) added. The vials are placed on a tumbling machine and the machine activated. After 24 hours, the vials are removed and the contents examined under a microscope and mortality counts made. At the 1000 p.p.m. concentration, 100% kill with 2-isopropylimino-1,3-dithietane is observed. With 1000, 100 and 1 p.p.m. concentrations of 2-imino-1,3-dithietane hydrochloride, 100% kill is observed.

EXAMPLE 11

The herbicidal activity of the compounds of the invention is demonstrated by the following tests wherein seeds of corn, wheat, radish, and cucumber are placed on the gelled surface of a water agar (3.0 Difco-Bacto agar) containing 500 or 100 p.p.m. of test compound. Two ml. of water are added to each agar plate to provide optimum conditions for germination and the plates are covered with kraft paper to minimize escape of volatile chemicals. The seeds and plants are observed periodically and water added as required. One week after initiation, the tests are evaluated. Representative compound, 2-imino-1,3-dithietane hydrochloride, demonstrates a 100% kill of the wheat, radish and cucumber seeds at 500 p.p.m. and blind germination of the corn seeds. At 100 p.p.m., the roots of the wheat, radish and cucumber plants are killed. Also at this latter concentration, the corn plants are killed.

2-acetylimino-1,3-dithietane produces 100% kill of wheat and radish at 500 p.p.m. and severe injury to cucumber and corn at the same rate.

2-methylcarbamoylimino-1,3-dithietane, while least effective than the above two latter compounds, shows injury to all species at the 500 p.p.m. rate.

EXAMPLE 12

The control of fungal organisms with the compounds of the invention is shown in tests wherein 7–10 day cultures of *Monilinia fructicola*, causative agent of American brown rot on stone fruit; *Stemphylium sarcinaeforme*, causative agent of leaf spot on legumes; and *Aspergillus niger*, the ubiquitous saprophyte that degrades textiles and fabrics, are treated with the test compound 2-isopropylimino-1,3-diethietane. The cultures are introduced into deionized water with orange juice added to facilitate germination. The above-named compound at 100 p.p.m. produces 100 percent control of each organism.

In a similar test against the bacteria *Aerobacter aerogenes*, *Staphylococcus aureus* and *Xanthomonas vesicatoria*, 2-imino-1,3-dithietane hydrochloride gives complete control when used at 100 p.p.m. concentration.

I claim:

1. A compound of the formula:

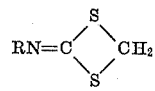

or the acid addition salts thereof,
wherein R is a member selected from the group consisting of lower alkyl, phenyl, mono-lower alkyl-substituted phenyl, mono-halo-substituted phenyl, benzyl, lower alkanoyl, halo-substituted lower alkanoyl, benzoyl, mono-lower alkyl benzoyl, lower alkyl carbamoyl, and when R is hydrogen, the compound is in the form of its acid addition salt.

2. The compound of claim 1, 2-isopropylimino-1,3-dithietane.

3. The compound of claim 1, 2-phenylimino-1,3-dithietane.

4. The compound of claim 1, 2-acetylimino-1,3-dithietane.

5. The compound of claim 1, 2-methylimino-1,3-dithietane.

6. A method for preparing an acid addition salt of 2-imino-1,3-dithietane according to claim 1 which comprises the steps of: reacting a 2-dialkoxyphosphinylimino-1,3-dithietane with a strong mineral acid, and recovering the corresponding 2-imino-1,3-dithietane acid addition salt.

7. A method for preparing a 2-acylimino-1,3-dithietane according to claim 1 which comprises the steps of: reacting in the presence of sodium acetate an acid addition salt of 2-imino-1,3-dithietane and an acylating compound represented by the formula: $(R_3CO)_2O$ wherein $R_3$ is a lower alkyl, phenyl halo-substituted phenyl or benzyl radical, and recovering a 2-acylimino-1,3-dithietane.

8. A method for preparing a 2-carbamoylimino-1,3-dithietane according to claim 1 which comprises the steps of: reacting in the presence of sodium acetate an acid addition salt of 2-imino-1,3-dithietane hydrohalide and a carbamylating compound represented by the formula: $R_3NCO$ wherein $R_3$ is a lower alkyl, phenyl or benzyl radicals, and recovering so-formed 2-carbamoylimino-1,3-dithietane.

References Cited

UNITED STATES PATENTS 3,342,835  9/1967  Lies _____ 260—327

OTHER REFERENCES

Menard et al., Chem. Abstracts, vol. 55 (1961), p. 14478.

Breslow et al., Heterocyclic Compounds—Multisulfur and Sulfur and Oxygen. Part one, Interscience Pub., N.Y. (January 1966), p. 545.

JAMES A. PATTEN, Primary Examiner

U.S. Cl. X.R.

71—90; 260—455; 424—277